US011653019B2

(12) United States Patent
Lin et al.

(10) Patent No.: US 11,653,019 B2
(45) Date of Patent: *May 16, 2023

(54) IMAGE CODING AND DECODING METHODS, IMAGE PROCESSING DEVICE AND COMPUTER STORAGE MEDIUM

(71) Applicants: ZTE CORPORATION, Guangdong (CN); TONGJI UNIVERSITY, Shanghai (CN)

(72) Inventors: Tao Lin, Shanghai (CN); Ming Li, Guangdong (CN); Ping Wu, Guangdong (CN); Guoqiang Shang, Guangdong (CN); Zhao Wu, Guangdong (CN)

(73) Assignees: ZTE CORPORATION, Guangdong (CN); TONGJI UNIVERSITY, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,832

(22) Filed: Sep. 23, 2021

(65) Prior Publication Data
US 2022/0014777 A1 Jan. 13, 2022

Related U.S. Application Data

(63) Continuation of application No. 15/736,006, filed as application No. PCT/CN2016/085015 on Jun. 6, 2016, now Pat. No. 11,159,818.

(30) Foreign Application Priority Data

Jun. 14, 2015 (CN) .................. 201510322825.X
May 27, 2016 (CN) .................. 201610364479.6

(51) Int. Cl.
H04N 19/517 (2014.01)
H04N 19/176 (2014.01)
(Continued)

(52) U.S. Cl.
CPC ......... H04N 19/517 (2014.11); H04N 19/105 (2014.11); H04N 19/11 (2014.11);
(Continued)

(58) Field of Classification Search
CPC .... H04N 19/517; H04N 19/105; H04N 19/11; H04N 19/13; H04N 19/136;
(Continued)

(56) References Cited

U.S. PATENT DOCUMENTS 11,159,818 B2 * 10/2021 Lin ...................... H04N 19/136
2004/0057515 A1 3/2004 Koto et al.
(Continued)

FOREIGN PATENT DOCUMENTS

CN 1703097 A 11/2005
CN 101094398 A 12/2007
(Continued)

OTHER PUBLICATIONS

WIPO, International Search Report dated Aug. 3, 2016.
(Continued)

Primary Examiner — Sath V Perungavoor
Assistant Examiner — Tyler B Edwards
(74) Attorney, Agent, or Firm — Li & Cai Intellectual Property (USA) Office

(57) ABSTRACT

Disclosed are an image coding and decoding methods, an image processing device, and a computer storage medium. The image coding method comprises: obtaining a dynamic range of a copy parameter of a current coding sampling value segment according to a size of a reference area; and coding the copy parameter according to the dynamic range to generate a video bitstream containing information about the size of the reference area and information about the copy parameter. The decoding method comprises: parsing a video bitstream to obtain a dynamic range of a copy parameter of (Continued)

a decoding sampling value segment; and decoding the copy parameter according to the dynamic range.

15 Claims, 11 Drawing Sheets

(51) Int. Cl.
| | |
|---|---|
| *H04N 19/13* | (2014.01) |
| *H04N 19/105* | (2014.01) |
| *H04N 19/46* | (2014.01) |
| *H04N 19/136* | (2014.01) |
| *H04N 19/11* | (2014.01) |
| *H04N 19/44* | (2014.01) |
| *H04N 19/91* | (2014.01) |
| *H04N 19/96* | (2014.01) |
| *H04N 19/593* | (2014.01) |

(52) U.S. Cl.
CPC ........... *H04N 19/13* (2014.11); *H04N 19/136* (2014.11); *H04N 19/176* (2014.11); *H04N 19/44* (2014.11); *H04N 19/46* (2014.11); *H04N 19/593* (2014.11); *H04N 19/91* (2014.11); *H04N 19/96* (2014.11)

(58) Field of Classification Search
CPC ...... H04N 19/176; H04N 19/44; H04N 19/46; H04N 19/593; H04N 19/91; H04N 19/96; H04N 19/70
See application file for complete search history.

(56) References Cited

U.S. PATENT DOCUMENTS

| | | | |
|---|---|---|---|
| 2005/0265455 A1 | 12/2005 | Kawaharada | |
| 2007/0237232 A1 | 10/2007 | Chang et al. | |
| 2011/0249749 A1 | 10/2011 | Takahashi et al. | |
| 2012/0263231 A1 | 10/2012 | Zhou | |
| 2013/0070856 A1 | 3/2013 | Sato | |
| 2014/0133567 A1* | 5/2014 | Rusanovskyy | ........ H04N 19/30 375/240.16 |
| 2014/0376634 A1* | 12/2014 | Guo | ................... H04N 19/186 375/240.16 |
| 2015/0016531 A1* | 1/2015 | Hannuksela | ........... H04N 19/31 375/240.16 |
| 2015/0030073 A1* | 1/2015 | Chen | ................... H04N 19/597 375/240.16 |
| 2015/0103915 A1 | 4/2015 | Xu et al. | |
| 2015/0373358 A1* | 12/2015 | Pang | ................... H04N 19/176 375/240.12 |
| 2017/0155899 A1* | 6/2017 | Lin | ...................... H04N 19/139 |

FOREIGN PATENT DOCUMENTS

| | | |
|---|---|---|
| CN | 101309405 A | 11/2008 |
| CN | 101416524 A | 4/2009 |
| CN | 102939757 A | 2/2013 |
| CN | 103647972 A | 3/2014 |
| EP | 2981090 A1 | 2/2016 |
| WO | WO2007/117711 A2 | 10/2007 |
| WO | WO2013/184949 A1 | 12/2013 |
| WO | WO2014/205339 A2 | 12/2014 |

OTHER PUBLICATIONS

First Office Action dated Aug. 19, 2019, for corresponding Chinese application No. 201610364479.6.
The second office action dated Dec. 13, 2018 for corresponding EP application No. 16810930.4.
The third office action dated Nov. 5, 2019 for corresponding EP application No. 16810930.4.
The notice of oral dated Jul. 16, 2020 for corresponding EP application No. 16810930.4.
The rejection of the EP application dated Mar. 9, 2021 for corresponding EP application No. 16810930.4.
The EESR dated Feb. 20, 2018 for corresponding EP application No. 16810930.4.
The EESR dated Aug. 5, 2021 for corresponding EP application No. 21178252.9.
Screen Content Coding Using Non-Square Intra Block Copy for HEVC dated Jul. 18, 2014.
"On Intra BC mode" Joint Collaborative Team on video Coding(JVT-VC) of ITU-TSG 16 WP3 and ISO/IEC JTC 1/SC 29/WG 11 15th meeting: Geneva, CH, Oct. 23-Nov. 1, 2013.
"Non-CE3: Improvement on Intra String Copy" Liping Zhao et al dated Feb. 17, 2015.

* cited by examiner

IMAGE CODING AND DECODING METHODS, IMAGE PROCESSING DEVICE AND COMPUTER STORAGE MEDIUM

CROSS-REFERENCE TO RELATED APPLICATIONS

The present application is a continuation of U.S. patent application Ser. No. 15/736,006, filed on Dec. 13, 2017, which is based upon and claims benefit of Chinese Patent Application No. 201510322825.X, filed on Jun. 14, 2015, and Chinese Patent Application No. 201610364479.6, filed on May 27, 2016, the contents of these applications are hereby incorporated by reference in their entirety.

TECHNICAL FIELD

The disclosure relates to digital video coding and decoding technologies, and particularly to picture coding and decoding methods, picture processing equipment and a computer storage medium.

BACKGROUND

Along with development of a television and a display into resolutions of super-high definition (4K) and extra super-high definition (8K) and development and popularization of a new-generation cloud computing and information processing mode and platform adopting a remote desktop as a typical representation form, a video compression requirement is also made for a higher-resolution composite picture including a picture shot by a camera and a computer screen picture. It becomes an indispensable technology of video coding for achieving an ultrahigh-compression ratio and extremely high-quality data compression.

Performing ultrahigh-efficiency compression on a video by fully utilizing characteristics of a 4K/8K picture and a computer screen picture is also a main objective of a latest international video compression standard High Efficiency Video Coding (HEVC) as well as other international standards, national standards and industrial standards.

An outstanding characteristic of a computer screen picture is that there may usually be many similar and even completely the same pixel patterns in the same picture. For example, a Chinese or foreign character frequently appearing in a computer screen picture is formed by a few basic strokes, and many similar or the same strokes may be found in the same frame of picture. A common menu, icon and the like in a computer screen picture also have many similar or the same patterns. Therefore, various copying manners are usually adopted in an existing picture and video compression technology, at least including the following copying manners:

1) intra block copying, i.e. intra block matching or called as intra motion compensation or called as block matching or called as block copying;

2) intra micro-block copying, i.e. intra micro-block matching or called as micro-block matching or called as micro-block copying;

3) intra line (called as line for short) copying, i.e. intra line matching or called as line matching or called as line copying;

4) intra string copying, i.e. intra string matching or called as string matching or called as string copying or called as pixel string copying;

5) palette index string copying, i.e. palette or called as index string copying;

6) a mixed copying manner by mixing index string copying and pixel string copying, called as an index-pixel string mixed copying manner for short, also called as a palette-pixel string mixed copying manner or a palette manner mixing pixel string copying or a pixel string copying manner mixing palette or a palette and pixel string copying manner; and 7) a multiple palette and pixel string copying manner combining multiple palette and pixel string copying manners.

A most common type of reference pixel sample sets is positioned in a reference region adjacent to or in the vicinity of current pixel sample segments. All the reference region is limited, so that value ranges of copying items, i.e. motion vectors or displacement vectors, are also limited. However, for a copying manner, when a motion vector is coded or decoded, a value range of the motion vector is not restricted, so that unnecessary bits are consumed, which greatly reduces compression efficiency of the copying manners, particularly compression efficiency of a multi-pixel segment copying manner with multiple motion vectors in a coding/decoding block, for example, a micro-block copying manner, a line copying manner, a pixel string copying manner and a palette and pixel string copying manner.

SUMMARY

In order to solve the technical problem, embodiments of the disclosure provide picture coding and decoding methods, picture processing equipment and a computer storage medium.

An embodiment of the disclosure provides a picture coding method, which may include that:

a dynamic boundary of a copying parameter of a current coding sample segment is acquired according to a size of a reference region; and the copying parameter is coded according to the dynamic boundary to generate a video bitstream including information of the size of the reference region and information of the copying parameter.

In the embodiment of the disclosure, one or more bits of at least one of the information of the size of the reference region, information of a position and size of the reference region or information of a value range of a motion vector may be written into the following one or more units of the video bitstream:

a video parameter set, a sequence parameter set, a picture parameter set, a slice header, a Coding Tree Unit (CTU) header, a Coding Unit (CU) header and a coding/decoding block header.

In the embodiment of the disclosure, the copying parameter may be a motion vector.

In the embodiment of the disclosure, the dynamic boundary of the copying parameter may be one, or more or all of a dynamic upper limit, a dynamic lower limit, a dynamic left limit and a dynamic right limit of a motion vector.

In the embodiment of the disclosure, the method may further include that:

truncated kth-order Exp-Golomb code binarization with a truncated value corresponding to the dynamic boundary and entropy coding are performed on the copying parameter according to the dynamic boundary, wherein $k \geq 0$.

An embodiment of the disclosure provides a picture decoding method, which may include that:

a video bitstream is parsed to acquire a dynamic boundary of a copying parameter of a decoding sample segment; and the copying parameter is decoded according to the dynamic boundary.

In the embodiment of the disclosure, the operation that the video bitstream is parsed to acquire the dynamic boundary of the copying parameter of the decoding sample segment may include that:

the video bitstream is parsed to acquire at least one of: information of a size of a reference region, information of a position and size of the reference region and information of a value range of a motion vector; and the dynamic boundary of the copying parameter of the decoding sample segment is determined according to the acquired information.

In the embodiment of the disclosure, the method may further include that: before the operation that the copying parameter is decoded according to the dynamic boundary, the bitstream is parsed to acquire information of the copying parameter.

In the embodiment of the disclosure, the bitstream corresponding to one or more units of a video parameter set, a sequence parameter set, a picture parameter set, a slice header, a CTU header, a CU header and a coding/decoding block header in the video bitstream may be parsed to acquire at least one of: the information of the size of the reference region, the information of the position and size of the reference region and the information of the value range of the motion vector.

In the embodiment of the disclosure, the copying parameter may be a motion vector.

In the embodiment of the disclosure, the dynamic boundary of the copying parameter may be one, or more or all of a dynamic upper limit, a dynamic lower limit, a dynamic left limit and a dynamic right limit of the motion vector.

In the embodiment of the disclosure, the method may further include that: truncated kth-order Exp-Golomb code binarization with a truncated value corresponding to the dynamic boundary and entropy decoding are performed on the copying parameter according to the dynamic boundary, wherein $k \geq 0$.

Another embodiment of the disclosure provides a picture coding method, which may include that:

a copying parameter of a coding sample segment is coded according to a dynamic position and size of a reference region; and a video bitstream including information of a position and size of the reference region and information of the copying parameter is generated.

In the embodiment of the disclosure, one or more bits of at least one of information of a size of the reference region, the information of the position and size of the reference region or information of a value range of a motion vector may be written into the following one or more units of the video bitstream:

a video parameter set, a sequence parameter set, a picture parameter set, a slice header, a CTU header, a CU header and a coding/decoding block header.

In the embodiment of the disclosure, the copying parameter may be a motion vector.

In the embodiment of the disclosure, a dynamic boundary of the copying parameter may be one, more or all of a dynamic upper limit, a dynamic lower limit, a dynamic left limit and a dynamic right limit of the motion vector.

In the embodiment of the disclosure, the dynamic position of the reference region may be represented by one or more region motion vectors.

In the embodiment of the disclosure, when the motion vector of the coding sample segment is coded according to the dynamic position and size of the reference region, the reference region may be formed by K reference sub-regions of the same shape and size as a coding/decoding block, wherein $K \geq 1$; and dynamic positions of the K reference sub-regions may be represented by K corresponding reference sub-region motion vectors respectively, and a motion vector of a current coding/decoding sample segment may be decomposed into a primary motion vector and a secondary motion vector, wherein the primary motion vector may be equal to a reference sub-region motion vector of a reference sub-region where a reference sample segment is located.

Another embodiment of the disclosure provides a picture decoding method, which may include that:

a video bitstream is parsed to at least acquire information of a position and size of a reference region and information of a copying parameter; and a copying parameter of a current decoding sample segment is decoded according to a dynamic position and size of the reference region.

In the embodiment of the disclosure, the bitstream corresponding to one or more units of a video parameter set, a sequence parameter set, a picture parameter set, a slice header, a CTU header, a CU header and a coding/decoding block header in the video bitstream may be parsed to acquire at least one of the following information: information of a size of the reference region, the information of the position and size of the reference region and information of a value range of a motion vector.

In the embodiment of the disclosure, the copying parameter may be a motion vector.

In the embodiment of the disclosure, a dynamic boundary of the copying parameter may be one, or more or all of a dynamic upper limit, a dynamic lower limit, a dynamic left limit and a dynamic right limit of the motion vector.

In the embodiment of the disclosure, the dynamic position of the reference region may be represented by one or more region motion vectors.

In the embodiment of the disclosure, when the motion vector of the current decoding sample segment is decoded according to the dynamic position and size of the reference region, the reference region may be formed by K reference sub-regions of the same shape and size as a current coding/decoding block, wherein $K \geq 1$; and dynamic positions of the K reference sub-regions may be represented by K corresponding reference sub-region motion vectors respectively, and a motion vector of a current coding/decoding sample segment may be decomposed into a primary motion vector and a secondary motion vector, wherein the primary motion vector may be equal to a reference sub-region motion vector of a reference sub-region where a current reference sample segment is located.

An embodiment of the disclosure provides picture processing equipment, which may include:

a first acquisition unit, configured to acquire a dynamic boundary of a copying parameter of a current coding sample segment according to a size of a reference region;

a CU, configured to code the copying parameter according to the dynamic boundary; and a generation unit, configured to generate a video bitstream including information of the size of the reference region and information of the copying parameter.

Another embodiment of the disclosure provides picture processing equipment, which may include:

a parsing unit, configured to parse a video bitstream to acquire a dynamic boundary of a copying parameter of a decoding sample segment; and a decoding unit, configured to decode the copying parameter according to the dynamic boundary.

Another embodiment of the disclosure provides picture processing equipment, which may include:

a CU, configured to code a copying parameter of a coding sample segment according to a dynamic position and size of a reference region; and a generation unit, configured to generate a video bitstream including information of position and size of the reference region and information of the copying parameter.

Another embodiment of the disclosure provides picture processing equipment, which may include:

a parsing unit, configured to parse a video bitstream to at least acquire information of position and size of the reference region and information of a copying parameter; and a decoding unit, configured to decode a copying parameter of a current decoding sample segment according to a dynamic position and size of a reference region.

An embodiment of the disclosure provides a computer storage medium, which may store a computer program, the computer program being configured to execute the abovementioned picture coding and/or picture decoding method(s).

In the technical solutions of the embodiments of the disclosure, a method for coding a picture includes that: the dynamic boundary of the copying parameter of the current coding sample segment is acquired according to the size of the reference region; the copying parameter is coded according to the dynamic boundary; and the video bitstream including the information of the size of the reference region and the information of the copying parameter is generated. Correspondingly, a method for decoding a picture includes that: the video bitstream is parsed to acquire the dynamic boundary of the copying parameter of the decoding sample segment; and the copying parameter is decoded according to the dynamic boundary. In addition, picture coding includes that: the copying parameter of the coding sample segment is coded according to the dynamic position and size of the reference region so as to generate the video bitstream including information of position and size of the reference region and information of the copying parameter. Correspondingly, picture decoding includes that: the video bitstream is parsed to at least acquire the information of position and size of the reference region and the information of the copying parameter; and the copying parameter of the current decoding sample segment is decoded according to the dynamic position and size of the reference region. In such a manner, in a copying manner, when a motion vector is coded or decoded, a value range of the motion vector is limited, so that bits are saved, and compression efficiency of the copying manner is improved.

BRIEF DESCRIPTION OF DRAWINGS

In the drawings (which may not be drawn to scale), similar drawing reference signs may describe similar parts in different drawings. Similar drawing reference signs with different letter suffixes may represent different examples of similar parts. The drawings substantially show each embodiment discussed in the disclosure not limitedly but exemplarily.

DETAILED DESCRIPTION

Figure 1:
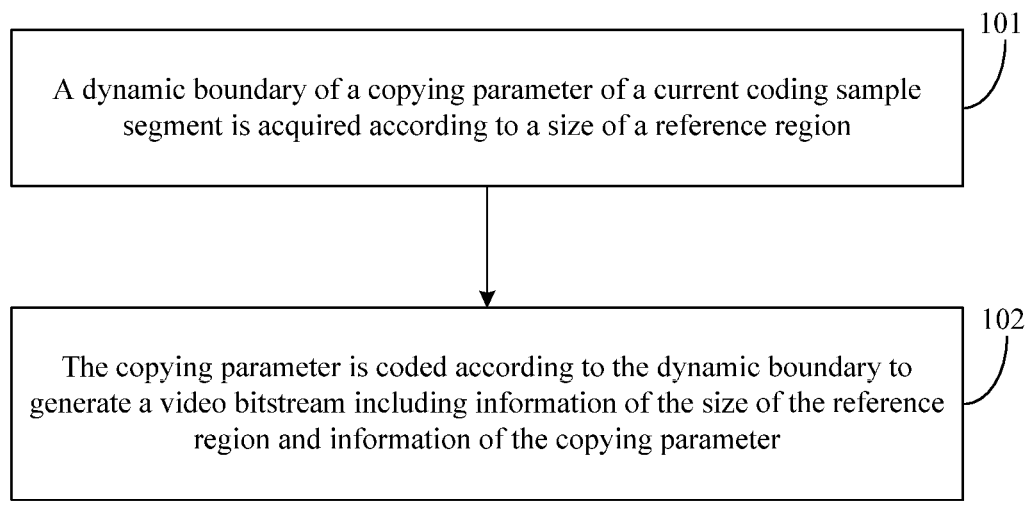
FIG. 1 is a first flowchart of a picture coding method according to an embodiment of the disclosure.

In order to make characteristics and technical contents of the embodiments of the disclosure understood in more detail, implementation of the embodiments of the disclosure will be elaborated below in combination with the drawings. The appended drawings are only adopted for description as references and not intended to limit the embodiments of the disclosure.

A natural form of a digital video signal is a sequence of pictures. A picture is usually a rectangular region formed by a plurality of pixels, and a digital video signal is a video picture sequence, which is also called as a video sequence or a sequence sometimes for short, formed by dozens of and even hundreds of thousands of pictures. Coding a digital video signal refers to coding pictures in the video sequence. At any time, the picture which is being coded is called as a current coding picture (or current decoding picture). Similarly, decoding a video bitstream (called as a bitstream for short) obtained by compressing the digital video signal refers to decode a bitstream of a sequence of pictures. At any time, the f picture which is being decoded is called as a current decoding picture. The current coding picture or the current decoding picture is collectively called as a current picture.

In almost all international standards for video coding such as Moving Picture Experts Group (MPEG-1/2/4) H.264/ Advanced Video Coding (AVC) and HEVC, when a frame of picture is coded (and correspondingly decoded), the picture is partitioned into a plurality of sub-pictures with M×M pixels, called as coding blocks (which are decoding blocks from the point of decoding, collectively called as coding and decoding blocks) or "CUs", and the blocks of the picture are coded one by one by taking a CU as a basic coding unit. M is usually 4, 8, 16, 32 and 64. Therefore, coding a video sequence refers to sequentially code CUs of a picture. At any time, a CU which is being coded is called as a current coding CU. Similarly, decoding a bitstream of a video sequence refers to sequentially decoding CUs of a picture to finally reconstruct the whole video sequence. At any time, a CU which is being decoded is called as a current decoding CU. The current coding CU or the current decoding CU is collectively called as a current CU.

In order to achieve adaptability to differences of picture contents and properties of a part in a picture for effective compression, sizes of CU in the picture may be different, some being 8×8, some being 64×64 and the like. In order to seamlessly splice CUs with different sizes, a picture is usually partitioned into "Largest Coding Units (LCUs)" of the same size containing N×N pixels at first, and then LCU can be further partitioned into multiple tree-structured CUs which may be of different sizes. LCUs is also called as "CTU". For example, a picture is partitioned into LCUs with the same size of 64×64 pixels (N=64) at first, wherein a certain LCU is further partitioned into three CUs of 32×32 pixels and four CUs with 16×16 pixels, and in such a manner, the seven tree-structured CUs form a CTU. The other LCU is formed by two CUs of 32×32 pixels, three CUs of 16×16 pixels and twenty CUs of 8×8 pixels, totally the 25 tree-structured CUs. Coding a picture refers to sequentially coding CUs in a LCUs. In the international standard HEVC, LCU and CTU are synonyms. A CU of a size equal to a CTU is called as a CU with a depth 0. CUs obtained by equally partitioning upper, lower, left and right parts of the CU with the depth 0 are called as CUs with depths 1. CUs obtained by equally partitioning upper, lower, left and right parts of a CU with the depth 1 are called as CUs with depths 2. CUs obtained by equally partitioning upper, lower, left and right parts of a CU with the depth 2 are called as CUs with depths 3. At any time, a CTU which is being coded is called as a current coding CTU. At any time, a CTU which is being decoded is called as a current decoding CTU. The current coding CTU or the current decoding CTU is collectively called as a current CTU.

A CU may further be partitioned into a plurality of sub-regions. The sub-regions include, but not limited to, a Prediction Unit (PU), a Transform Unit (TU) and an Asymmetric Multi-Processing (AMP) region.

A color pixel usually consists of three components. Two most common pixel color formats include a Green, Blue and Red (GBR) color format consisting of a green component, a blue component and a red component, YUV color format consisting of a luma component and two chroma components. Colour formats collectively called as YUV actually include multiple color formats, such as YCbCr color format. When a CU is coded, the CU may be partitioned into three component planes (a G plane, a B plane and an R plane or a Y plane, a U plane and a V plane) which are coded respectively; and three components of a pixel may also be bundled and combined into a triple, and the whole CU formed by these triples is coded. The former pixel and component arrangement manner is called as a planar format of a picture (and its CUs), and the latter pixel and component arrangement manner is called as a packed format of the picture (and its CUs). A GBR color format and YUV color format of a pixel are both three-component representation formats of the pixel.

Besides a three-component representation format of a pixel, another common representation format of the pixel in a conventional art is a palette index representation format. In the palette index representation format, a numerical value of a pixel may also be represented by an index of a palette. Palette (or palette space) stores numerical values or approximate numerical values of three components of a color of the pixel to be represented. An address of the palette is called as an index of the color of the pixel stored in the address. An index may represent a component of a color of a pixel, and an index may also represent three components of a color of a pixel. There may be one or more palettes. Under the condition that there are multiple palettes, a complete index is actually formed by two parts, i.e. a palette number (representing the specific one in the multiple palettes) and an index of the palette with the palette number. An index representation format of a pixel refers to represent the pixel with an index. If not all pixels in a picture region (for example, a coding block or a decoding block) may be represented with palette colors (that is, for at least one pixel in the picture region, there is no palette color of which three components have numerical values equal to or approximately equal to the pixel and an index thereof), there is usually a special index, called as an escape color and configured to represent the pixel which may not be represented with a color of a normal palette. Therefore, if an index of a pixel of an index indicates an escape color, three other dedicated components are required to represent a color of the pixel. A normal color and escape color in a palette are both called as palette colors, but the escape color is a virtual color, and there is no physical space for storing this color but a special dedicated virtual index in the palette. An index of an escape color is usually set as last index of a palette. The index representation format of the pixel is also called as an indexed color or pseudo color representation format of the pixel, or is usually directly called as an indexed pixel or a pseudo pixel or a pixel index or an index. An index is also called as an exponent sometimes. Representing a pixel in an index representation format is also called as indexing or exponentiating.

Other common pixel representation formats include a CMYK representation format and a grayscale representation format.

A YUV color format may also be subdivided into a plurality of sub-formats according to whether to perform down-sampling on a chroma component or not: a YUV4:4:4 pixel colorformat under which a pixel is formed by a Y component, a U component and a V component; a YUV4:2:2 pixel colorformat under which two left and right adjacent pixels are formed by two Y components, a U component and a V component; and a YUV4:2:0 pixel colorformat under which four left, right, upper and lower adjacent pixels arranged according to 2×2 spatial positions are formed by four Y components, a U component and a V component. A component is usually represented by a number with 8-16 bits. The YUV4:2:2 pixel colorformat and the YUV4:2:0 pixel colorformat are both obtained by executing chroma component down-sampling on the YUV4:4:4 pixel colorformat. A pixel component is also called as a pixel sample, or is simply called as a sample.

A most basic element during coding or decoding may be a pixel, may also be a pixel component, and may further be a pixel index (i.e. indexed pixel). A pixel or pixel component or indexed pixel adopted as the most basic element for coding or decoding is collectively called as a pixel sample, and is also collectively called as a pixel value sometimes or simply called as a sample.

In the embodiments of the disclosure, "pixel sample", "pixel value", "sample", "indexed pixel" and "pixel index" are synonyms, and according to the context, it is clear that whether a "pixel" is represented or "a pixel component" is represented or an "indexed pixel" is represented or any one of the three is simultaneously represented. If it cannot get clear from the context, any one of the three is simultaneously represented.

In the embodiments of the disclosure, a coding block or a decoding block (collectively called as a coding and decoding block) is a region formed by a plurality of pixels. A shape of the coding and decoding block may be a rectangle, a square, a parallelogram, a trapezoid, a polygon, a round, an ellipse, a string and any other shape. The rectangle also includes a rectangle of which a width or height is one pixel and which is degenerated into a line (i.e. a line segment or a line shape). In a picture, coding block (or decoding blocks) may have a different shape and size. In a frame of picture, some or all of coding blocks (or decoding blocks) may have mutually overlapped parts, and all of the coding blocks (or decoding blocks) may also not be overlapped. A coding block (or decoding block) may be formed by "pixels", may also be formed by "components of the pixels", may also be formed by "indexed pixels", may also be formed by mixing the three, and may further be formed by mixing any two of the three. From the point of video coding or decoding, a coding block (or decoding block) refers to a region which is coded (or decoded) in a picture, including, but not limited to, at least one of: an LCU, a CTU, a CU, a sub-region of the CU, a PU and a TU.

An outstanding characteristic of a computer screen picture is that there may usually be many similar and even completely the same pixel patterns in the same picture. For example, a Chinese or foreign character frequently appearing in a computer screen picture is formed by a few basic strokes, and many similar or the same strokes may be found in the same picture. A common menu, icon and the like in a computer screen picture also have many similar or the same patterns. Therefore, a copying manner adopted by a picture and video compression technology at least includes the following copying manners.

1) Intra block copying, i.e. intra block matching or called as intra motion compensation or called as block matching or called as block copying: a basic operation of block copying coding or decoding refers to copy a reference block of the same size (the same number of pixel samples) as a current block from a reconstructed reference pixel sample set for the current coding block or current decoding block (called as the current block) and assign a numerical value of the reference block to the current block. A copying parameter of the block copying manner includes a displacement vector of the current block, which indicates a relative position between the reference block and the current block. A current block has a displacement vector.

2) Intra micro-block copying, i.e. intra micro-block matching or called as micro-block matching or called as micro-block copying: during micro-block copying, a current block (for example, 8×8 pixel samples) is partitioned into multiple micro-blocks (such as micro-blocks with 4×2 pixel samples or micro-blocks with 8×2 pixel samples or micro-blocks with 2×4 pixel samples or micro-blocks with 2×8 pixel samples), and a basic operation of micro-block copying coding or decoding refers to copying a reference micro-block from a reconstructed reference pixel sample set for a coding micro-block or decoding micro-block (called as a current micro-block) in the current block and assign a numerical value of the reference micro-block to the current micro-block. A copying parameter of the micro-block copying manner includes a displacement vector of the current micro-block, which indicates a relative position between the reference micro-block and the current micro-block. A current micro-block has a displacement vector. A number of micro-blocks into which a current block is partitioned is equal to a number of displacement vectors.

3) Intra line (called as line (or strip) for short) copying, i.e. intra line matching or called as line matching or called as line copying: a line is a micro-block with a height 1 or a width 1, such as a micro-block with 4×1 or 8×1 or 1×4 or 1×8 pixel samples. A basic operation of line copying coding or decoding refers to copy a reference line from a reconstructed reference pixel sample set for a coding line or decoding line (called as a current line for short) in a current block and assign a numerical value of the reference line. Obviously, line copying is a special condition of micro-block copying. A copying parameter of the line copying manner includes a displacement vector of the current line, which indicates a relative position between the reference line and the current line. A current line has a displacement vector. A number of lines into which a current block is partitioned is equal to a number of displacement vectors.

4) Intra string copying, i.e. intra string matching or called as string matching or called as string copying or called as pixel string copying: during pixel string copying, a current coding block or current decoding block (called as a current block) is partitioned into multiple pixel sample strings with variable lengths. Here, a string refers to arranging pixel samples in a two-dimensional region in any shape into a string of which a length is far larger than a width (such as a string of which a width is a pixel sample while a length is 37 pixel samples or a string of which a width is two pixel samples while a length is 111 pixel samples, usually under, but not limited to, the condition that the length is an independent coding or decoding parameter while the width is a parameter which is predetermined or derived from another coding or decoding parameter). A basic operation of string copying coding or decoding refers to copy a reference string from a reconstructed reference pixel sample set for a coding string or decoding string (called as a current string for short) in the current block and assign a numerical value of the reference string. A copying parameter of the string copying manner includes a displacement vector and copying length, i.e. copying size, of the current string, which indicate a relative position between the reference string and the current string and a length of the current string, i.e. a number of pixel samples, respectively. The length of the current string is also a length of the reference string. A current string has a displacement vector and a copying length. A number of strings into which a current block is partitioned is equal to a number of displacement vectors and a number of copying lengths. The displacement vector is also called as a copying position, and its representation form includes: a two-dimensional coordinate, a linear address, a distance, a pointer, an index, a number, a mode number and the like.

5) Palette index string copying, i.e. palette or called as index string copying: in palette coding and corresponding decoding manners, a palette is constructed or acquired at first, then part or all of pixels of a current coding block or current decoding block (called as a current block for short) are represented with an index of a palette color in the palette, and the index is coded and decoded, including, but not limited to: partitioning an index of a current block into multiple variable-length index strings for index string copying coding and decoding. A basic operation of index string copying coding and decoding refers to copying a reference index string from an indexed reconstructed reference pixel sample set for an index coding string or index decoding string (called as a current index string for short) in the current block and assign an index numerical value of the reference index string to a current index string. A copying parameter of the index string copying manner includes a displacement vector and copying length, i.e. copying size, of the current index string, which indicate a relative position between the reference index string and the current index string and a length, i.e. a number of corresponding pixel samples, of the current index string respectively. The length of the current index string is also a length of the reference index string. A current index string has a displacement vector and a copying length. A number of index strings into which a current block is partitioned is equal to a number of displacement vectors and a number of copying lengths. The displacement vector is also called as a copying position, and its representation form includes one or more of the followings: a two-dimensional coordinate, a linear address, a distance, a pointer, an index, a number, a mode number and the like. In the palette index string copying manner, a copied reference pixel is extracted from the palette. Therefore, an index string is also called as a palette color string or a palette pixel string or a palette string, and the index string copying manner is also called as a palette copying manner or a palette manner. In the palette manner, a string is also called as a run or a run length. Therefore, an index string is also called as an index run or an index run length or called as a run or a run length for short. A palette color of a current block is sourced from a pixel color of the current block and/or a palette color candidate set, and the palette color candidate set is formed by accumulating part of palette colors of coding and decoding blocks which have been coded and decoded.

6) A mixed copying manner mixing index string copying and pixel string copying, called as an index-pixel string mixed copying manner for short, also called as a palette-pixel string mixed copying manner or a palette manner mixing pixel string copying or a pixel string copying manner mixing a palette or a palette and pixel string copying manner: when a current coding block or current decoding block (called as a current block for short) is coded or decoded, a pixel string copying manner is adopted for part or all of pixels, and an index copying manner, i.e. a palette manner extracting a reference pixel from a palette, is adopted for part or all of the pixels.

7) A multiple palette and pixel string copying manner combining multiple palette and pixel string copying manners: at least two different palettes and pixel string copying manners are adopted for coding and decoding. Different palette and pixel string copying manners adopt different mixing solutions to mix palette copying and pixel string copying. In a picture, a palette and pixel string copying manner of a mixing solution I is adopted for part of coding/decoding blocks, a palette and pixel string copying manner of a mixing solution II is adopted for part of coding/decoding blocks, a palette and pixel string copying manner of a mixing solution III is adopted for part of coding/decoding blocks, and the like. Different mixing solutions may be different mainly in the following aspects: 1) a number of sorts of strings, 2) a value range of a parameter, 3) (a) value range(s) of one or a plurality of copying parameters, 4) a value range of a copying position, i.e. a displacement vector, 5) a position of a current index or a current pixel, 6) a position of a current sample segment, 7) a position of a reference index or a reference pixel, 8) a position of a reference sample segment, and 9) a copying shape.

Other copying manners further include a rectangular copying manner, a copying manner mixing a plurality of copying manners and the like.

A block in the block copying manner, a micro-block in the micro-block copying manner, a line in the line copying manner, a string in the string copying manner, a rectangle in the rectangular copying manner and a pixel index string in the palette index manner are collectively called as pixel sample segments, also called as sample segments for short. A basic element of a sample segment is a pixel or a pixel component or a pixel index. A sample segment has a copying parameter, configured to represent a relationship between a current pixel sample segment and a reference pixel sample segment. Therefore, a sample segment is a minimum unit of a copying operation with the same copying relationship. A copying parameter includes a plurality of copying parameter components, the copying parameter components at least including: a displacement vector horizontal component, a displacement vector vertical component, a one-dimensional displacement vector, a linear address, a relative linear address, an index, a palette linear address, a relative index, a palette relative linear address, a copying length, a copying width, a copying height, a rectangle width, a rectangle length and an unmatched pixel (also called as a reference-free pixel, i.e. a non-copying pixel which is not copied from another place).

In a copying manner, pixel samples or indexes are required to be arranged according to a certain sequence. An arrangement manner is also called as a scanning manner. The scanning manner may be partitioned into the following manners according to a path shape.

A) A horizontal Z-shaped scanning manner, also called as a horizontal raster scanning manner: pixel samples or indexes of a coding block or decoding block (collectively called as a coding/decoding block) are arranged in rows, and are arranged in all the rows according to the same direction (all from left to right or all from right to left). The rows may be arranged from top to bottom, and may also be arranged from bottom to top.

B) A vertical Z-shaped scanning manner, also called as a vertical raster scanning manner: pixel samples or indexes of a coding block or decoding block (collectively called as a coding/decoding block) are arranged in columns, and are arranged in all the columns according to the same direction (all from top to bottom or all from bottom to top). The columns may be arranged from left to right, and may also be arranged from right to left.

C) A horizontal arched scanning manner: pixel samples or indexes of a coding block or decoding block (collectively called as a coding/decoding block) are arranged in rows, are arranged in the odd rows according to a direction (for example: from left to right), and are arranged in the even rows according to another (opposite) direction (for example: from right to left). The rows may be arranged from top to bottom, and may also be arranged from bottom to top.

D) A vertical arched scanning manner: pixel samples or indexes of a coding block or decoding block (collectively called as a coding/decoding block) are arranged in columns, are arranged in the odd columns according to a direction (for example: from top to bottom), and are arranged in the even columns according to another (opposite) direction (for example: from bottom to top). The columns may be arranged from left to right, and may also be arranged from right to left.

In a string copying (index string copying or pixel string copying or index spring-pixel string mixed copying) manner, there are the following two basic copying manners.

I) A one-dimensional linear copying shape: a of a current string and a reference string is a one-dimensional sample string formed in a coding/decoding block according to a sequence of a predetermined scanning manner, and has an equal length, but two-dimensional regions formed by the two strings respectively may not have the same two-dimensional shape.

II) a two-dimensional conformal copying shape: a current string is arranged in a current coding/decoding block according to a sequence of a predetermined scanning manner, and a reference string and the current string keep completely the same two-dimensional shape, and have an equal length.

A above basic copying shape may further be sub partitioned into multiple copying shapes according to a specific scanning manner, for example, a vertical arched one-dimensional linear copying shape and a horizontal Z-shaped two-dimensional conformal copying shape.

It is important to note that "copying" is a reconstruction and decoding operation, and a corresponding decoding operation is "matching". Therefore, a copying manner, for example, a block matching manner, a micro-block copying manner, a line copying manner, a pixel string copying manner and an index string copying manner, is also called as a block matching manner, a micro-block matching manner, a line matching manner, a pixel string matching manner, an index string matching manner and the like.

A type of reference pixel sample sets is positioned in reference regions adjacent to or in the vicinity of current pixel sample segments. All the reference regions are limited, so that value ranges of copying positions, i.e. motion vectors, are also limited. However, for a copying manner, when a motion vector is coded or decoded, a value range of the motion vector is not defined, so that unnecessary bits are consumed, and compression efficiency of the copying manners is greatly reduced, particularly compression efficiency of a multi-pixel segment copying manner with multiple motion vectors in a coding/decoding block, for example, a micro-block copying manner, a line copying manner, a pixel string copying manner and a palette and pixel string copying manner.

On such a basis, the embodiments of the disclosure provide picture coding and decoding methods and picture processing equipment. Before a motion vector is coded/decoded, a value range of the motion vector is limited at first.

In the embodiments of the disclosure, a size(s) of a reference region(s) of one or more coding/decoding blocks are fixed. In the embodiments of the disclosure, the size(s) of the reference region(s) of the one or more coding/decoding blocks are bounded. In the embodiments of the disclosure, the size(s) of the reference region(s) of the one or more coding/decoding blocks are adaptively limited, that is, such a limit is determined by other properties (for example, positions of the coding/decoding blocks or similarities of pixels of the coding/decoding blocks and other regions in a picture) of the coding/decoding blocks. In the embodiments of the disclosure, (a) position(s) of the reference region(s) of the one or more coding/decoding blocks are fixed. In the embodiments of the disclosure, the position(s) of the reference region(s) of the one or more coding/decoding blocks are adaptively limited, that is, such a limit is determined by the other properties (for example, the positions of the coding/decoding blocks or the similarities of the pixels of the coding/decoding blocks and the other regions in the picture) of the coding/decoding blocks. In the embodiments of the disclosure, (a) value range(s) of (a) motion vector(s) of one or more current pixel sample segments are fixed. In the embodiments of the disclosure, (a) value range(s) of the motion vector(s) of the one or more current pixel sample segments are bounded. In the embodiments of the disclosure, the value range(s) of the motion vector(s) of the one or more current pixel sample segments are adaptively limited, that is, such a limit is determined by other properties (for example, positions of the current pixel sample segments, or the positions of the current pixel sample segments, or similarities of pixels of the current pixel sample segments and other regions in the picture) of the current pixel sample segments.

In the technical solutions of the embodiments of the disclosure, a size and position of a reference region of a coding/decoding block are limited, and limits to sizes and positions of reference regions of different coding/decoding blocks may be different and adaptively and dynamically change. A value range of a motion vector of a current pixel sample segment is limited, and limits to value ranges of motion vectors of different current pixel sample segments may be different and adaptively and dynamically change.

In the technical solutions of the embodiments of the disclosure, in a copying manner, particularly a multi-pixel segment copying manner, a reference region is an adaptively and dynamically limited region, a value range of a motion vector is an adaptively and dynamically limited value range, and self-limited coding/decoding, i.e. adaptively and dynamically limited coding/decoding, is performed on the motion vector according to a limit to the value range of the motion vector.

In the solutions, self-limited coding/decoding at least includes a binarization method with a truncated value corresponding to the limit and entropy coding/decoding.

In the solutions, self-limited coding/decoding at least includes a truncated kth-order Exp-Golomb code binarization method with the truncated value corresponding to the limit and entropy coding/decoding, wherein $k \geq 0$.

In the solutions, a truncated kth-order Exp-Golomb code is a kth-order Exp-Golomb code of which a prefix and/or suffix have/has a truncated value(s).

In the solutions, self-limited coding/decoding at least includes decomposition of a group including a plurality of motion vectors into a primary motion vector and a plurality of secondary motion vectors.

In the solutions, the adaptively and dynamically limited region includes K ($K \geq 1$) reference sub-regions of the same size and shape as a current coding/decoding block, and self-limited coding/decoding at least includes division of motion vectors of the current coding/decoding block into K groups of motion vectors and decomposition of a motion vector of a group into a common primary motion vector and a secondary motion vector.

In the solutions, the reference region is specified and limited with one or more syntactic elements at one or more units of: a video parameter set, a sequence parameter set, a picture parameter set, a slice header, a CTU header, a CU header and a coding/decoding block header of a video bitstream.

In the embodiments of the disclosure, the value range of the motion vector is specified and limited with one or more syntactic elements at one or more units of: the video parameter set, the sequence parameter set, the picture parameter set, the slice header, the CTU header, the CU header, and the coding/decoding block header of the video bitstream.

FIG. 1 is a first flowchart of a picture coding method according to an embodiment of the disclosure. As shown in FIG. 1, the picture coding method includes the following steps.

In Step 101, a dynamic boundary of a copying parameter of a current coding sample segment is acquired according to a size of a reference region.

In Step 102, the copying parameter is coded according to the dynamic boundary to generate a video bitstream including information of the size of the reference region and information of the copying parameter.

In the solution of the embodiment of the disclosure, one or more bits of at least one of information of the size of the reference region, information of position and size of the reference region, information of a value range of a motion vector are written into the following one or more units of the video bitstream:

a video parameter set, a sequence parameter set, a picture parameter set, a slice header, a CTU header, a CU header and a coding/decoding block header, wherein the video parameter set usually refers to one or more syntactic elements directly existing in the sequence parameter set or implicitly deduced from the video parameter set;

the sequence parameter set usually refers to one or more syntactic elements directly existing in the sequence parameter set or implicitly deduced from the sequence parameter set;

the picture parameter set usually refers to one or more syntactic elements directly existing in the picture parameter set or implicitly deduced from the picture parameter set;

the slice header usually refers to one or more syntactic elements directly existing in the slice header or implicitly deduced from the slice header;

the CTU header usually refers to one or more directly syntactic elements existing in the CTU header or implicitly deduced from the CTU header;

the CU header usually refers to one or more directly existing or implicitly deduced syntactic elements directly existing in the CU header or implicitly deduced from the CU header; and the coding/decoding block usually refers to one or more syntactic elements directly existing in the coding/decoding block header or implicitly deduced from the coding/decoding block header.

In the solution of the embodiment of the disclosure, the copying parameter is a motion vector.

In the solution of the embodiment of the disclosure, the dynamic boundary of the copying parameter is one, or more or all of a dynamic upper limit, a dynamic lower limit, a dynamic left limit and a dynamic right limit of the motion vector.

In the solution of the embodiment of the disclosure, truncated kth-order Exp-Golomb code binarization with a truncated value corresponding to the dynamic boundary and entropy coding are performed on the copying parameter according to the dynamic boundary, wherein $k \geq 0$.

Figure 2:
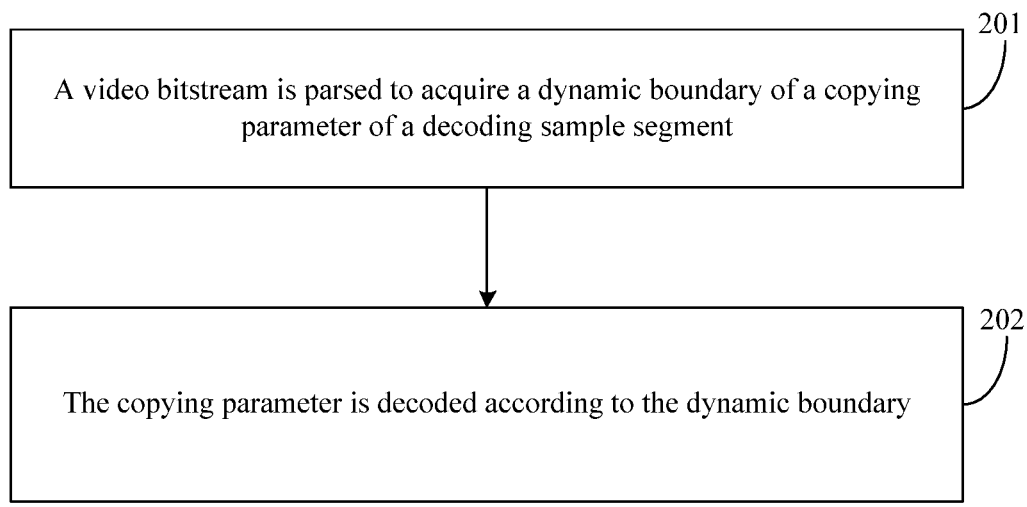
FIG. 2 is a first flowchart of a picture decoding method according to an embodiment of the disclosure.

FIG. 2 is a first flowchart of a picture decoding method according to an embodiment of the disclosure. As shown in FIG. 2, the picture decoding method includes the following steps.

In Step 201, a video bitstream is parsed to acquire a dynamic boundary of a copying parameter of a decoding sample segment.

In Step 202, the copying parameter is decoded according to the dynamic boundary.

In the solution of the embodiment of the disclosure, the operation that the video bitstream is parsed to acquire the dynamic boundary of the copying parameter of the decoding sample segment includes that:

the video bitstream is parsed to acquire at least one of the following information: information of the size of the reference region, information of position and size of the reference region and information of a value range of a motion vector; and the dynamic boundary of the copying parameter of the decoding sample segment is determined according to the acquired information.

In the solution of the embodiment of the disclosure, the method further includes that: before the operation that the copying parameter is decoded according to the dynamic boundary, the bitstream is parsed to acquire information of the copying parameter.

In the solution of the embodiment of the disclosure, the bitstream corresponding to one or more units of a video parameter set, a sequence parameter set, a picture parameter set, a slice header, a CTU header, a CU header and a coding/decoding block header in the video bitstream is parsed to acquire at least one of the following information: information of the size of the reference region, information of position and size of the reference region and information of a value range of the motion vector.

In the solution of the embodiment of the disclosure, the copying parameter is a motion vector.

In the solution of the embodiment of the disclosure, the dynamic boundary of the copying parameter is one, or more or all of a dynamic upper limit, a dynamic lower limit, a dynamic left limit and a dynamic right limit of the motion vector.

In the solution of the embodiment of the disclosure, truncated kth-order Exp-Golomb code binarization with a truncated value corresponding to the dynamic boundary and entropy decoding are performed on the copying parameter according to the dynamic boundary, wherein $k \geq 0$.

Figure 3:
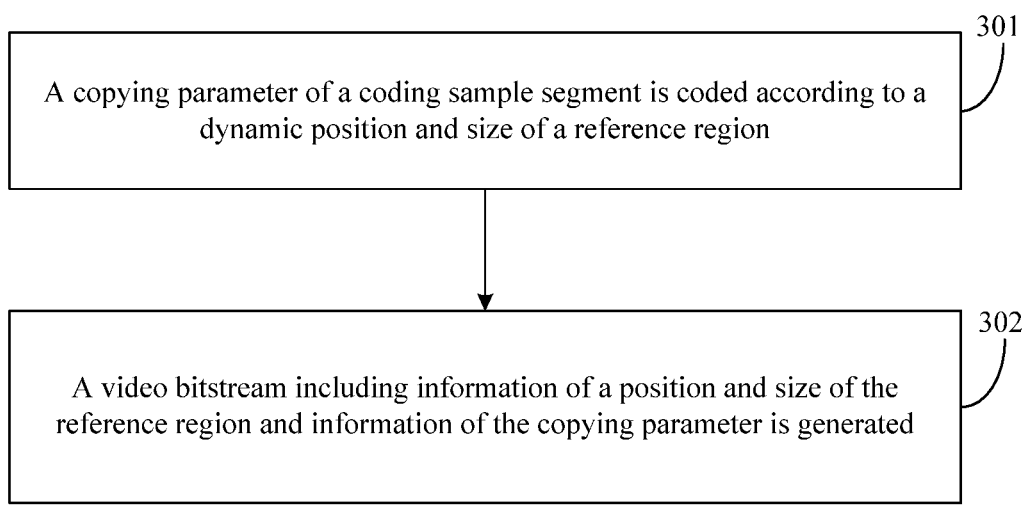
FIG. 3 is a second flowchart of a picture coding method according to an embodiment of the disclosure.

FIG. 3 is a second flowchart of a picture coding method according to an embodiment of the disclosure. As shown in FIG. 3, the picture coding method includes the following steps.

In Step 301, a copying parameter of a coding sample segment is coded according to a dynamic position and size of a reference region.

In Step 302, a video bitstream including information of a position and size of the reference region and information of the copying parameter is generated.

In the solution of the embodiment of the disclosure, one or more bits of at least one of information of the size of the reference region, information of position and size of the reference region, and information of a value range of a motion vector are written into the following one or more units of the video bitstream:

a video parameter set, a sequence parameter set, a picture parameter set, a slice header, a CTU header, a CU header and a coding/decoding block header.

In the solution of the embodiment of the disclosure, the copying parameter is a motion vector.

In the solution of the embodiment of the disclosure, a dynamic boundary of the copying parameter is one, more or all of a dynamic upper limit, a dynamic lower limit, a dynamic left limit and a dynamic right limit of the motion vector.

In the solution of the embodiment of the disclosure, the dynamic position of the reference region is represented by one or more region motion vectors.

In the solution of the embodiment of the disclosure, when the motion vector of the coding sample segment is coded according to the dynamic position and size of the reference region, the reference region is formed by K reference sub-regions of the same shape and size as a coding/decoding block, wherein $K \geq 1$; and dynamic positions of the K reference sub-regions are represented by K corresponding reference sub-region motion vectors respectively, and a motion vector of a current coding/decoding sample segment is decomposed into a primary motion vector and a secondary motion vector, wherein the primary motion vector is equal to a reference sub-region motion vector of a reference sub-region where a reference sample segment is located.

Figure 4:
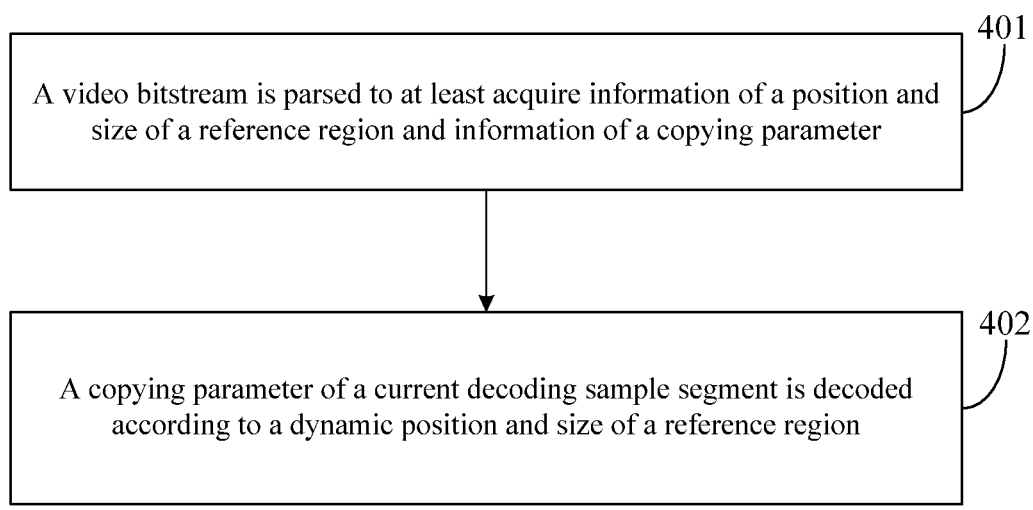
FIG. 4 is a second flowchart of a picture decoding method according to an embodiment of the disclosure.

FIG. 4 is a second flowchart of a picture decoding method according to an embodiment of the disclosure. As shown in FIG. 4, the picture decoding method includes the following steps.

In Step 401, a video bitstream is parsed to at least acquire information of a position and size of a reference region and information of a copying parameter.

In Step 402, a copying parameter of a current decoding sample segment is decoded according to a dynamic position and size of a reference region.

In the solution of the embodiment of the disclosure, the bitstream corresponding to one or more units of a video parameter set, a sequence parameter set, a picture parameter set, a slice header, a CTU header, a CU header and a coding/decoding block header in the video bitstream is parsed to acquire at least one of the following information: information of the size of the reference region, information of position and size of the reference region and information of a value range of a motion vector.

In the solution of the embodiment of the disclosure, the copying parameter is a motion vector.

In the solution of the embodiment of the disclosure, a dynamic boundary of the copying parameter is one, or more or all of a dynamic upper limit, a dynamic lower limit, a dynamic left limit and a dynamic right limit of the motion vector.

In the solution of the embodiment of the disclosure, the dynamic position of the reference region is represented by one or more region motion vectors.

In the solution of the embodiment of the disclosure, when the motion vector of the current decoding sample segment is decoded according to the dynamic position and size of the reference region, the reference region is formed by K reference sub-regions of the same shape and size as a current coding/decoding block, wherein $K \geq 1$; and dynamic positions of the K reference sub-regions are represented by K corresponding reference sub-region motion vectors respectively, and a motion vector of a current coding/decoding sample segment is decomposed into a primary motion vector and a secondary motion vector, wherein the primary motion vector is equal to a reference sub-region motion vector of a reference sub-region where a current reference sample segment is located.

Figure 5:
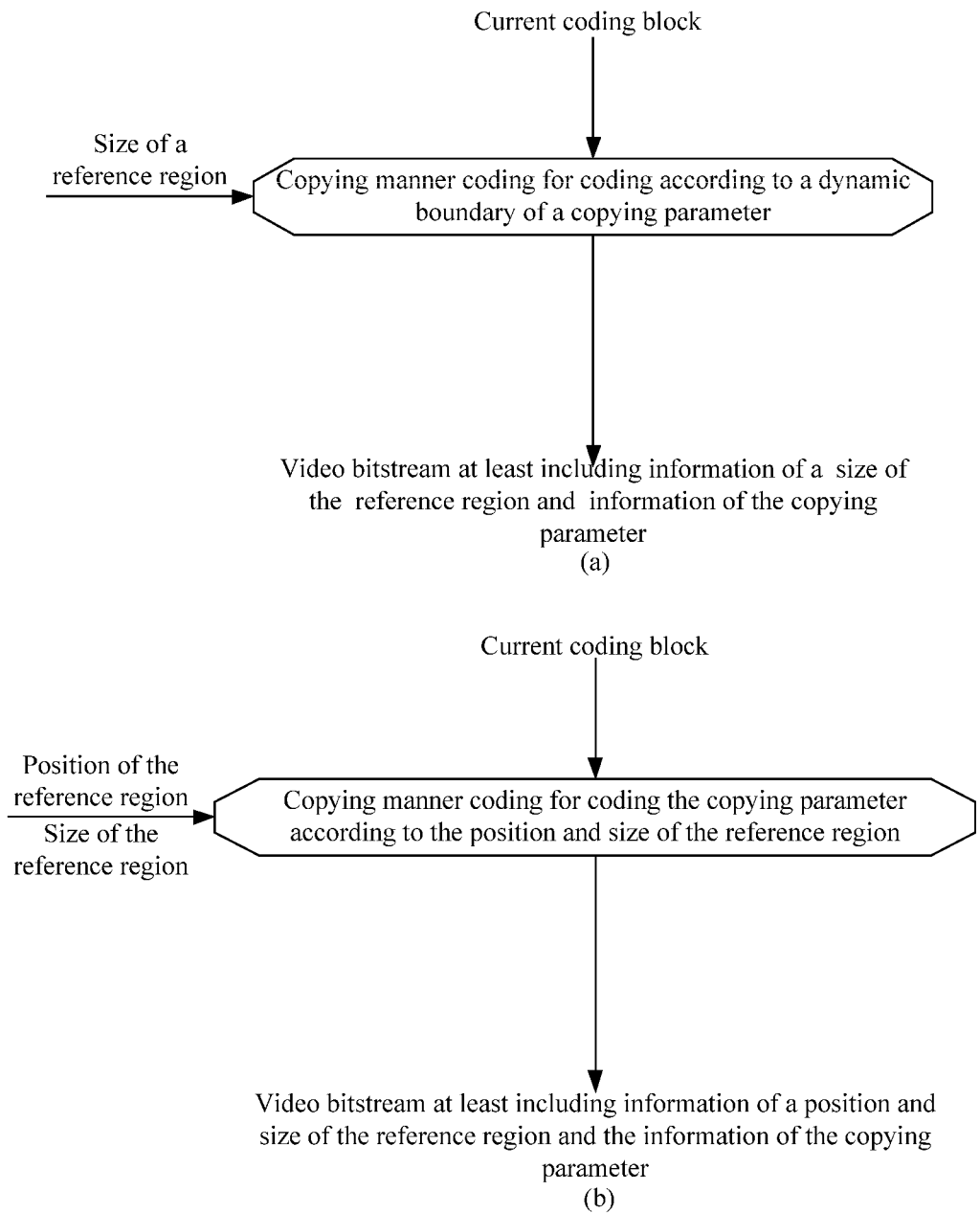
FIG. 5 is a third flowchart and fourth flowchart of a picture coding method according to an embodiment of the disclosure.

FIG. 5(a) is a third flowchart of a picture coding method according to an embodiment of the disclosure. As shown in the figure, in the flowchart:

coding is performed so as to generate a video bitstream at least including information of the size of the reference region and information of a copying parameter by adopting a copying manner at least including the following functions and operations: a dynamic boundary of a copying parameter of a current coding sample segment is acquired from a size of a reference region, and the copying parameter is coded according to the dynamic boundary.

FIG. 5(b) is a fourth flowchart of a picture coding method according to an embodiment of the disclosure. As shown in the figure, in the flow:

coding is performed to generate a video bitstream at least including information of position and size of the reference region and information of a copying parameter by adopting a copying manner at least including the following functions and operations: a copying parameter of a current coding sample segment is coded according to a dynamic position and size of a reference region.

Figure 6:
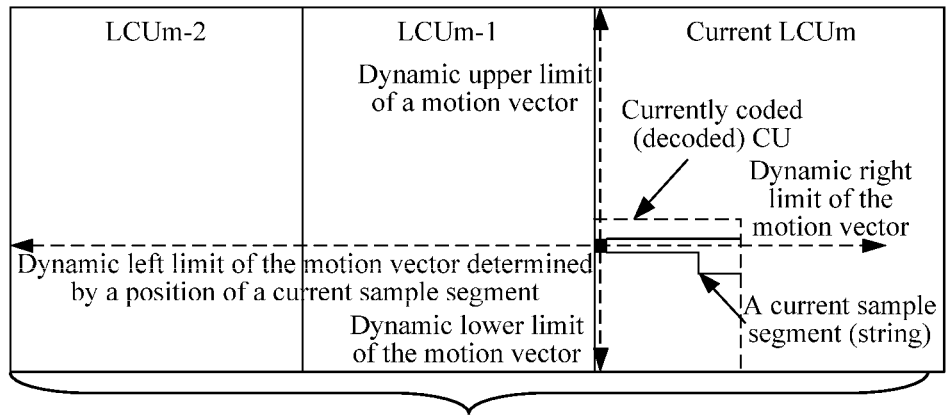
FIG. 6 is an example diagram of a size of a reference region, a position of the reference region and a dynamic boundary of a motion vector according to an embodiment of the disclosure.
Figure 6:
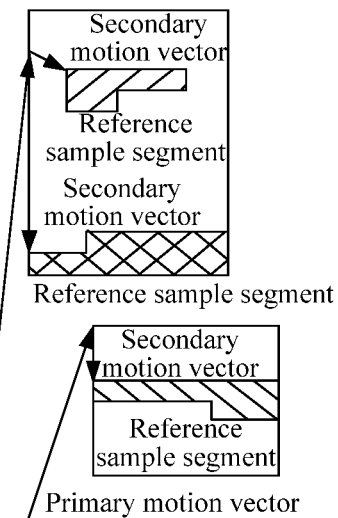
Figure 6:
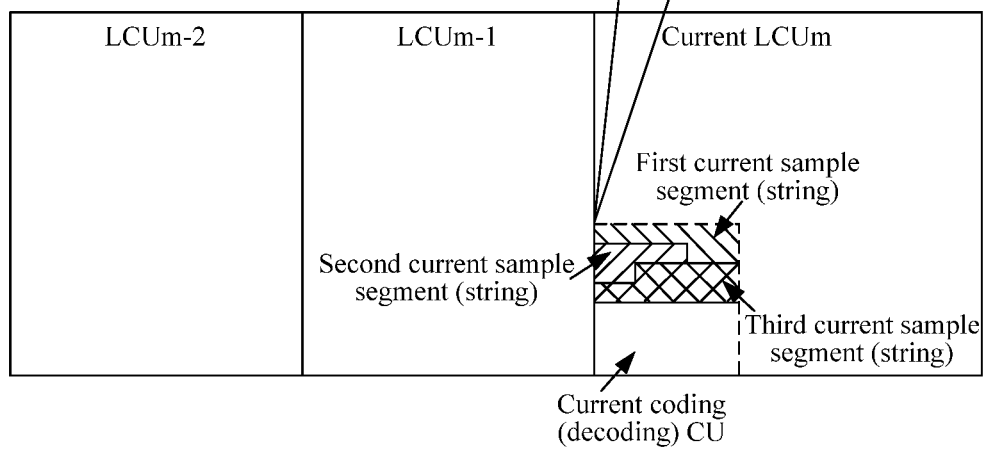

In an implementation mode, the copying parameter is a motion vector. FIG. 6 is an example.

In an implementation mode, the reference region includes a current CTU and a plurality of adjacent CTUs, so that the size of the reference region includes sizes of the current CTU and multiple adjacent CTUs. FIG. 6(a) is an example.

In an implementation mode, a dynamic boundary of the copying parameter is a dynamic upper limit, a dynamic lower limit, a dynamic left limit and a dynamic right limit of the motion vector, as shown in FIG. 6(a).

In an implementation mode, binarization with a truncated value corresponding to the dynamic boundary and entropy coding are performed on the copying parameter according to the dynamic boundary.

In an implementation mode, truncated kth-order Exp-Golomb code binarization with the truncated value corresponding to the dynamic boundary and entropy coding are performed on the copying parameter according to the dynamic boundary, wherein $k \geq 0$.

In an implementation mode, a truncated kth-order Exp-Golomb code is a kth-order Exp-Golomb code, a prefix and/or suffix of which have/has a truncated value(s).

In an implementation mode, the dynamic position of the reference region is represented by one or more region motion vectors. A primary motion vector is shown in FIG. 6(b).

In an implementation mode, the dynamic position of the reference region is represented by one or more region motion vectors, and the size of the reference region includes (a) size(s) of one or more current coding blocks, as shown in FIG. 6(b).

In an implementation mode, the reference region is formed by one or more regions of the same shape and size as a current coding block, and the dynamic position of the reference region is represented by one or more corresponding region motion vectors, as shown in FIG. 6(b).

In an implementation mode, when the motion vector of the current coding sample segment is coded according to the dynamic position and size of the reference region, a group including a plurality of motion vectors of the current coding sample segment are decomposed into a primary motion vector and a plurality of secondary motion vectors, as shown in FIG. 6(b).

In an implementation mode, when the motion vector of the current coding sample segment is coded according to the dynamic position and size of the reference region, the reference region is formed by $K \geq 1$) reference sub-regions of the same shape and size as the current coding block, dynamic positions of the K reference sub-regions are represented by K ($K \geq 1$) corresponding reference sub-region motion vectors respectively, the motion vector of the current coding sample segment is decomposed into a primary motion vector and a secondary motion vector, and the primary motion vector is equal to the reference sub-region motion vector of the reference sub-region where a current reference sample segment is located, as shown in FIG. 6(b).

In an implementation mode, information of the size of the reference region exists at one or more units of a video parameter set, a sequence parameter set, a picture parameter set, a slice header, a CTU header, a CU header and coding/decoding block header of the video bitstream.

In an implementation mode, the information of position and size of the reference region exists at one or more units of: the video parameter set, a sequence parameter set, a picture parameter set, a slice header, a CTU header, a CU header and coding/decoding block header of the video bitstream.

Figure 7:
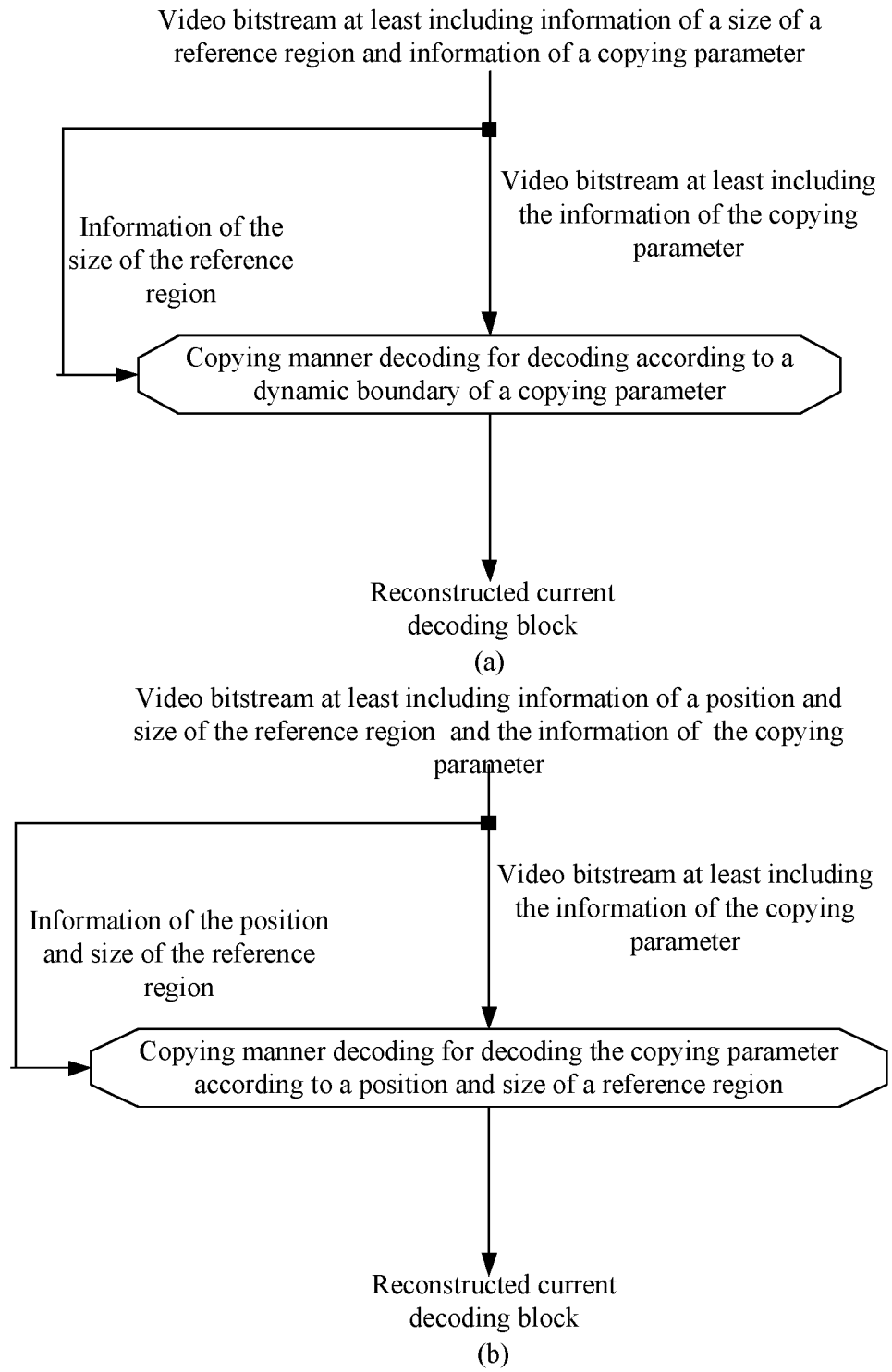
FIG. 7 is a third flowchart and fourth flowchart of a picture decoding method according to an embodiment of the disclosure.

FIG. 7(a) is a third flowchart of a picture decoding method according to an embodiment of the disclosure. As shown in the figure, in the flowchart:

a video bitstream is parsed to at least acquire information of the size of the reference region and information of the copying parameter, and decoding is performed by adopting a copying manner at least including the following functions and operations: a dynamic boundary of a copying parameter of a current decoding sample segment is acquired from a size of a reference region, and the copying parameter is decoded according to the dynamic boundary.

FIG. 7(b) is a fourth flowchart of a picture decoding method according to an embodiment of the disclosure. As shown in the figure, in the flow:

a video bitstream is parsed to at least acquire information of position and size of the reference region and information of the copying parameter, and decoding is performed by adopting a copying manner at least including the following functions and operations: a copying parameter of a current decoding sample segment is decoded according to a dynamic position and size of a reference region.

In an implementation mode, the copying parameter is a motion vector, as shown in FIG. 6.

In an implementation mode, the reference region includes a current CTU and a plurality of adjacent CTUs, so that the size of the reference region includes sizes of the current CTU and multiple adjacent CTUs, as shown in FIG. 6(a).

In an implementation mode, a dynamic boundary of the copying parameter is a dynamic upper limit, a dynamic lower limit, a dynamic left limit and a dynamic right limit of the motion vector, as shown in FIG. 6(a).

In an implementation mode, binarization with a truncated value corresponding to the dynamic boundary and entropy decoding are performed on the copying parameter according to the dynamic boundary.

In an implementation mode, truncated kth-order Exp-Golomb code binarization with the truncated value corresponding to the dynamic boundary and entropy decoding are performed on the copying parameter according to the dynamic boundary, wherein $k \geq 0$.

In an implementation mode, a truncated kth-order Exp-Golomb code is a kth-order Exp-Golomb code, a prefix and/or suffix of which have/has a truncated value(s).

In an implementation mode, the dynamic position of the reference region is represented by one or more region motion vectors. A primary motion vector is shown in FIG. 6(b).

In an implementation mode, the dynamic position of the reference region is represented by one or more region motion vectors, and the size of the reference region includes a size(s) of one or more current decoding blocks, as shown in FIG. 6(b).

In an implementation mode, the reference region is formed by one or more regions of the same shape and size as a current decoding block, and the dynamic position of the reference region is represented by one or more corresponding region motion vectors, as shown in FIG. 6(b).

In an implementation mode, when the motion vector of the current decoding sample segment is decoded according to the dynamic position and size of the reference region, a group including a plurality of motion vectors of the current decoding sample segment is decomposed into a primary motion vector and a plurality of secondary motion vectors, as shown in FIG. 6(b).

In an implementation mode, when the motion vector of the current decoding sample segment is decoded according to the dynamic position and size of the reference region, the reference region is formed by K ($K \geq 1$) reference sub-regions of the same shape and size as the current decoding block, dynamic positions of the K reference sub-regions are represented by K ($K \geq 1$) corresponding reference sub-region motion vectors respectively, the motion vector of the current decoding sample segment is decomposed into a primary motion vector and a secondary motion vector, and the primary motion vector is equal to a reference sub-region motion vector of a reference sub-region where a current reference sample segment is located. FIG. 6(b) is an example.

In an implementation mode, information of the size of the reference region exists at one or more of positions of a video parameter set, a sequence parameter set, a picture parameter set, slice header, a CTU header, a CU header and coding/decoding block header of the video bitstream.

In an implementation mode, the information of position and size of the reference region exists at one or more of units of a video parameter set, a sequence parameter set, a picture parameter set, a slice header, a CTU header, a CU header and a coding/decoding block header of the video bitstream.

The disclosure is applied to coding and decoding of a packed format picture. The disclosure is also applied to coding and decoding of a component planar format picture.

Figure 8:
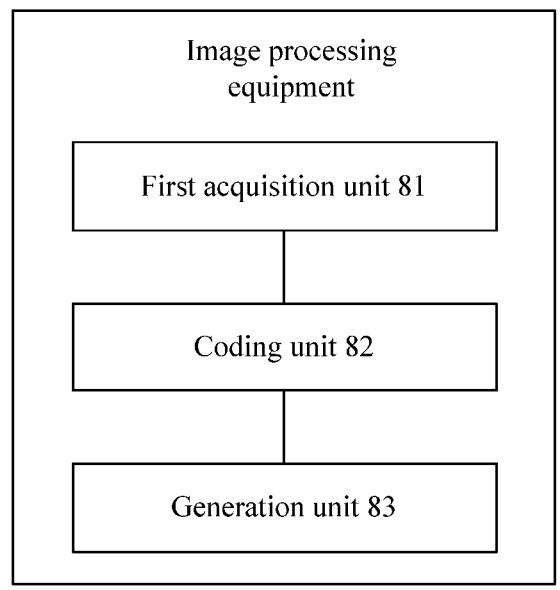
FIG. 8 is a first structure diagram of picture processing equipment according to an embodiment of the disclosure.

FIG. 8 is a first structure diagram of picture processing equipment according to an embodiment of the disclosure. The picture processing equipment may code the picture. As shown in FIG. 8, the picture processing equipment includes:

a first acquisition unit 81, configured to acquire a dynamic boundary of a copying parameter of a current coding sample segment according to a size of a reference region;

a CU 82, configured to code the copying parameter according to the dynamic boundary; and a generation unit 83, configured to generate a video bitstream including information of the size of the reference region and information of the copying parameter.

Those skilled in the art should know that a function realized by a unit in the picture processing equipment shown in FIG. 8 may be understood with reference to the related descriptions of the picture coding method. The function of a unit in the picture processing equipment shown in FIG. 8 may be realized through a program running on a processor, and may also be realized through a specific logic circuit.

During a practical application, the function realized by a unit in the picture processing equipment may be carried out through a Central Processing Unit (CPU), or Micro Processor Unit (MPU), Digital Signal Processor (DSP), Field Programmable Gate Array (FPGA) and the like located in the picture processing equipment.

Figure 9:
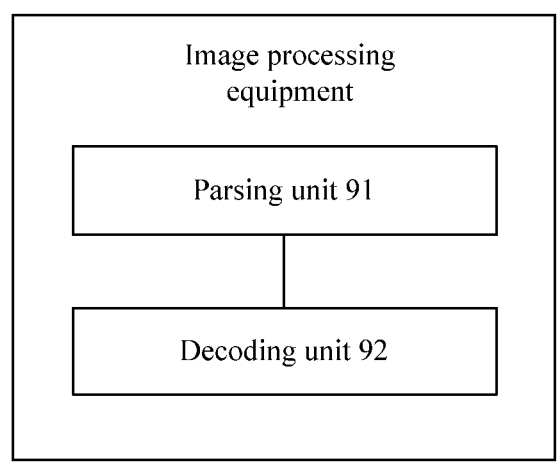
FIG. 9 is a second structure diagram of picture processing equipment according to an embodiment of the disclosure.

FIG. 9 is a second structure diagram of picture processing equipment according to an embodiment of the disclosure. The picture processing equipment may decode a picture. As shown in FIG. 9, the picture processing equipment includes:

a parsing unit 91, configured to parse a video bitstream to acquire a dynamic boundary of a copying parameter of a decoding sample segment; and a decoding unit 92, configured to decode the copying parameter according to the dynamic boundary.

Those skilled in the art should know that a function realized by a unit in the picture processing equipment shown in FIG. 9 may be understood with reference to the related descriptions of the picture coding method. The function of a unit in the picture processing equipment shown in FIG. 9 may be carried out through a program running on a processor, and may also be realized through a specific logic circuit.

During a practical application, the function realized by a unit in the picture processing equipment may be realized through a CPU, or MPU, DSP, FPGA and the like located in the picture processing equipment.

Figure 10:
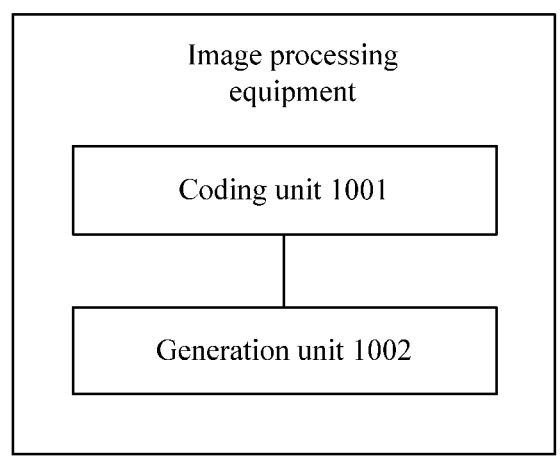
FIG. 10 is a third structure diagram of picture processing equipment according to an embodiment of the disclosure.

FIG. 10 is a third structure diagram of picture processing equipment according to an embodiment of the disclosure.

The picture processing equipment may code a picture. As shown in FIG. 10, the picture processing equipment includes:

a CU 1001, configured to code a copying parameter of a coding sample segment according to a dynamic position and size of a reference region; and a generation unit 1002, configured to generate a video bitstream including information of position and size of the reference region and information of the copying parameter.

During a practical application, a function realized by a unit in the picture processing equipment may be carried out through a CPU, or MPU, DSP, FPGA and the like located in the picture processing equipment.

Figure 11:
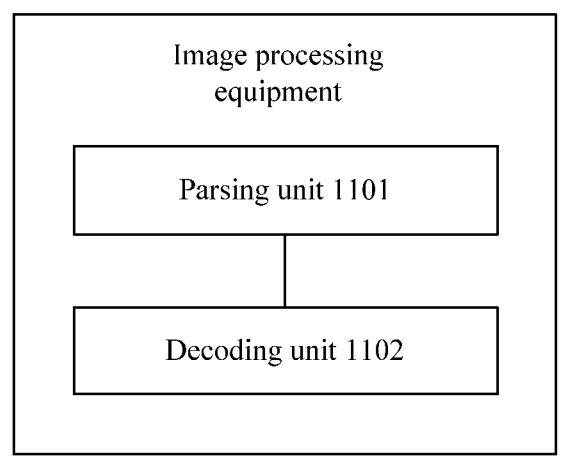
FIG. 11 is a fourth structure diagram of picture processing equipment according to an embodiment of the disclosure.

FIG. 11 is a fourth structure diagram of picture processing equipment according to an embodiment of the disclosure. The picture processing equipment may decode a picture. As shown in FIG. 11, the picture processing equipment includes:

a parsing unit 1101, configured to parse a video bitstream to at least acquire information of position and size of the reference region and information of the copying parameter; and a decoding unit 1102, configured to decode a copying parameter of a current decoding sample segment according to a dynamic position and size of a reference region.

During a practical application, a function realized by a unit in the picture processing equipment may be carried out through a CPU, or MPU, DSP, FPGA and the like located in the picture processing equipment.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

When being implemented in form of software function module and sold or used as an independent product, the picture processing equipment of the embodiments of the disclosure may also be stored in a computer-readable storage medium. Based on such an understanding, the technical solutions of the embodiments of the disclosure substantially or parts making contributions to a conventional art may be embodied in form of software product, and the computer software product is stored in a storage medium, including a plurality of instructions configured to enable computer equipment (which may be a personal computer, a server, network equipment or the like) to execute all or part of the methods in an embodiment of the disclosure. The above-mentioned storage medium includes: various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, the embodiments of the disclosure further provide a computer storage medium, in which a computer program is stored, the computer program being configured to execute a picture coding method and/or picture decoding method of the embodiments of the disclosure.

The disclosure is described with reference to flowcharts and/or block diagrams of the method, equipment (system) and computer program product according to the embodiment of the disclosure. It should be understood that a flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

INDUSTRIAL APPLICABILITY

According to the solutions of the embodiments of the disclosure, the dynamic boundary of the copying parameter of the current coding sample segment is acquired according to the size of the reference region; the copying parameter is coded according to the dynamic boundary; and the video bitstream including the information of the size of the reference region and the information of the copying parameter is generated. The video bitstream is parsed to acquire the dynamic boundary of the copying parameter of the decoding sample segment; and the copying parameter is decoded according to the dynamic boundary. In addition, the copying parameter of the coding sample segment is coded according to the dynamic position and size of the reference region; and the video bitstream including the information of position and size of the reference region and the information of the copying parameter is generated. The video bitstream is parsed to at least acquire the information of position and size of the reference region and the information of the copying parameter; and the copying parameter of the current decoding sample segment is decoded according to the dynamic position and size of the reference region. In such a manner, in a copying manner, when a motion vector is coded or decoded, a value range of the motion vector is limited, so that bits are saved, and compression efficiency of the copying manner is improved.

What is claimed is:

1. A picture coding method, comprising:
acquiring a dynamic boundary of a copying parameter of a current coding sample segment according to a size of a reference region, the copying parameter being a motion vector; and
coding the copying parameter according to the dynamic boundary and writing one or more bits of at least one of information of the size of the reference region, information of a position and size of the reference region or information of a value range of the motion vector into a video bitstream to generate the video bitstream comprising the information of the size of the reference region and the information of the copying parameter;
wherein the operation of coding the copying parameter according to the dynamic boundary is accomplished in one of the following manners: index-pixel string mixed copying, and a multiple palette and pixel string copying manner combining multiple palette and pixel string copying manners.

2. The picture coding method according to claim 1, wherein the operation of writing one or more bits of at least one of information of the size of the reference region, information of a position and size of the reference region or information of a value range of the motion vector into a video bitstream comprises:
writing the one or more bits of the at least one of the information of the size of the reference region, the information of the position and the size of the reference region or the information of the value range of the motion vector into the following one or more units of the video bitstream:
a video parameter set, a sequence parameter set, a picture parameter set, a slice header, a Coding Tree Unit (CTU) header, a Coding Unit (CU) header and a coding/decoding block header.

3. The picture coding method according to claim 1, wherein the dynamic boundary of the copying parameter is one, or more or all of a dynamic upper limit, a dynamic lower limit, a dynamic left limit and a dynamic right limit of the motion vector.

4. The picture coding method according to claim 1, wherein the method further comprising: performing truncated kth-order Exp-Golomb code binarization with a truncated value corresponding to the dynamic boundary and entropy coding on the copying parameter according to the dynamic boundary, wherein $k \geq 0$.

5. A picture decoding method, comprising:
parsing a video bitstream to acquire a dynamic boundary of a copying parameter of a decoding sample segment and acquire information of the copying parameter; and
decoding the copying parameter according to the dynamic boundary, the copying parameter being a motion vector;
wherein parsing the video bitstream to acquire the dynamic boundary of the copying parameter of the decoding sample segment comprises:
parsing the video bitstream to acquire at least one of: information of a size of a reference region, information of a position and size of the reference region or information of a value range of the motion vector; and
determining the dynamic boundary of the copying parameter of the decoding sample segment according to the acquired information,
wherein the video bitstream to be parsed is encoded in one of the following manners: index-pixel string mixed copying, and a multiple palette and pixel string copying manner combining multiple palette and pixel string copying manners.

6. The picture decoding method of claim 5, wherein the dynamic boundary of the copying parameter is one, or more or all of a dynamic upper limit, a dynamic lower limit, a dynamic left limit and a dynamic right limit of the motion vector.

7. The picture decoding method of claim 5, wherein the method further comprising:
performing truncated kth-order Exp-Golomb code binarization with a truncated value corresponding to the dynamic boundary and entropy decoding on the copying parameter according to the dynamic boundary, wherein $k \geq 0$.

8. The picture decoding method according to claim 5, wherein the bitstream corresponding to one or more units of a video parameter set, a sequence parameter set, a picture parameter set, a slice header, a Coding Tree Unit (CTU) header, a Coding Unit (CU) header and a coding/decoding block header in the video bitstream is parsed to acquire at least one of: the information of the size of the reference region, the information of the position and size of the reference region and the information of the value range of the motion vector.

9. A picture processing equipment, comprising a processor and a memory for storing a set of instructions executable by the processor, wherein when the instructions are executed by the processor, the processor is configured to:
parse a video bitstream to acquire a dynamic boundary of a copying parameter of a decoding sample segment and acquire information of the copying parameter; and
decode the copying parameter according to the dynamic boundary, the copying parameter being a motion vector;
wherein parsing the video bitstream to acquire the dynamic boundary of the copying parameter of the decoding sample segment comprises:
parsing the video bitstream to acquire at least one of: information of a size of a reference region, information of a position and size of the reference region or information of a value range of the motion vector; and
determining the dynamic boundary of the copying parameter of the decoding sample segment according to the acquired information,
wherein the video bitstream to be parsed is encoded in one of the following manners: index-pixel string mixed copying, and a multiple palette and pixel string copying manner combining multiple palette and pixel string copying manners.

10. The picture processing equipment according to claim 9, wherein the dynamic boundary of the copying parameter is one, or more or all of a dynamic upper limit, a dynamic lower limit, a dynamic left limit and a dynamic right limit of the motion vector.

11. The picture processing equipment according to claim 9, wherein when the instructions are executed by the processor, the processor is further configured to:
performing truncated kth-order Exp-Golomb code binarization with a truncated value corresponding to the dynamic boundary and entropy decoding on the copying parameter according to the dynamic boundary, wherein $k \geq 0$.

12. The picture processing equipment according to claim 9, wherein the bitstream corresponding to one or more units of a video parameter set, a sequence parameter set, a picture parameter set, a slice header, a Coding Tree Unit (CTU) header, a Coding Unit (CU) header and a coding/decoding block header in the video bitstream is parsed to acquire at least one of: the information of the size of the reference region, the information of the position and size of the reference region and the information of the value range of the motion vector.

13. A picture processing equipment, comprising a processor and a memory for storing a set of instructions executable by the processor, wherein when the instructions are executed by the processor, the processor is configured to implement the method of claim 1.

14. A non-transitory computer storage medium stored therein computer-executable instructions that, when executed by a processor, cause the processor to execute a picture coding method according to claim 1.

15. A non-transitory computer storage medium stored therein computer-executable instructions that, when executed by a processor, cause the processor to execute a picture coding method according to claim 5.

* * * * *